US010936623B2

(12) United States Patent
Mahalingam et al.

(10) Patent No.: US 10,936,623 B2
(45) Date of Patent: Mar. 2, 2021

(54) METHOD AND SYSTEM FOR SYNCHRONIZING DATABASES AUTOMATICALLY AND PERIODICALLY

(71) Applicant: Clari Inc., Sunnyvale, CA (US)

(72) Inventors: Sanjay Kumar Mahalingam, Sunnyvale, CA (US); Rajkumar Ponnusamy, Sunnyvale, CA (US); William Patterson, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 318 days.

(21) Appl. No.: 15/885,048

(22) Filed: Jan. 31, 2018

(65) Prior Publication Data

US 2019/0236199 A1 Aug. 1, 2019

(51) Int. Cl.

*G06F 16/27* (2019.01)
*G06F 9/54* (2006.01)
*G06F 16/23* (2019.01)

(52) U.S. Cl.

CPC .............. *G06F 16/27* (2019.01); *G06F 9/542* (2013.01); *G06F 16/23* (2019.01); *G06F 16/2358* (2019.01)

(58) Field of Classification Search

None
See application file for complete search history.

(56) References Cited

U.S. PATENT DOCUMENTS

| | | | | |
|---|---|---|---|---|
| 2006/0080363 | A1 * | 4/2006 | Vadlamani | G06Q 10/10 |
| 2017/0083871 | A1 * | 3/2017 | Chang | G06Q 10/1095 |
| 2019/0213557 | A1 * | 7/2019 | Dotan-Cohen | G06Q 10/1093 |

* cited by examiner

*Primary Examiner* — Giuseppi Giuliani
(74) *Attorney, Agent, or Firm* — Womble Bond Dickinson (US) LLP

(57) ABSTRACT

Through a first processing thread, a first database is accessed via a first API to retrieve a list of event objects of the first database. Through a second processing thread, for each of the event objects, participant identifiers (IDs) are determined from the event object. For each of the participant IDs, a domain ID is extracted from the participant ID. A list of one or more entity objects are identified based on the domain ID, where the entity objects are stored in a second database such as a task database storing and managing many tasks. At least one attribute of at least one of the entity objects is modified based of the participant ID and the domain ID, which generates a modified entity object. Through a third processing thread, any event objects that have been modified are transmitted to the second database via a second API over the network.

18 Claims, 8 Drawing Sheets

METHOD AND SYSTEM FOR SYNCHRONIZING DATABASES AUTOMATICALLY AND PERIODICALLY

FIELD OF THE INVENTION

Embodiments of the present invention relate generally to database management. More particularly, embodiments of the invention relate to synchronizing databases automatically and periodically.

BACKGROUND

Organizations need to maintain an accurate and current databases of information they have. As data may be stored in multiple databases and often these databases are incompatible. For example, activities associated with tasks may be maintained and stored in an activity database or server, while information associated with the tasks may be maintained and stored in a task database or server. It is important to maintain the consistency of data amongst the databases.

Currently, this database synchronization amongst multiple databases, such as activity databases and task databases, has to be performed manually, for example, by a data entry person. Such a manual process is a time-consuming process that yields incomplete and inaccurate results.

BRIEF DESCRIPTION OF THE DRAWINGS

Embodiments of the invention are illustrated by way of example and not limited to the figures of the accompanying drawings in which like references indicate similar elements.

DETAILED DESCRIPTION

Figure 1A:
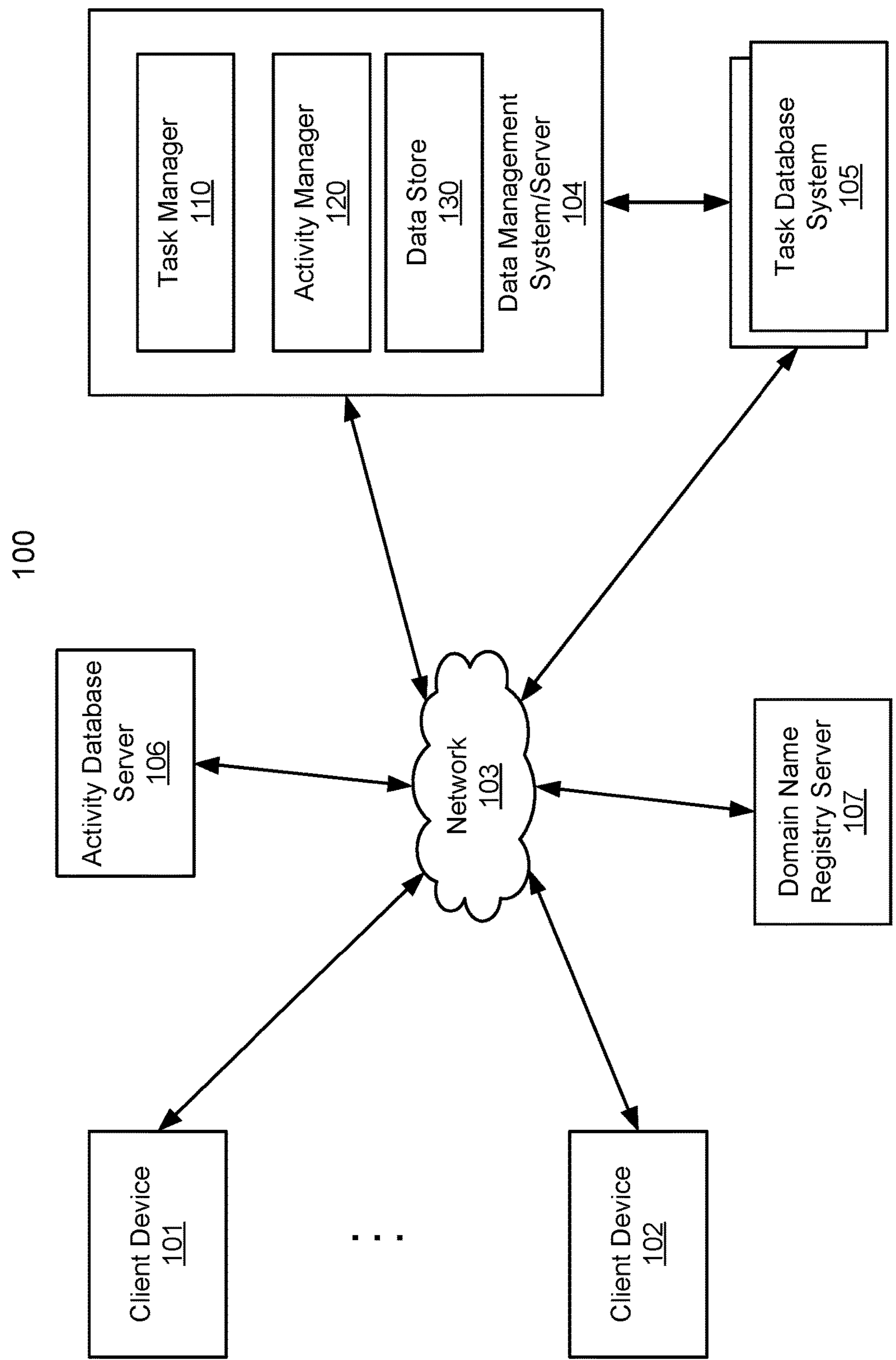
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a database synchronization system hosted by a data analytics or data management platform is utilized to synchronize data between two different databases over a network, such as, for example, an activity database and a task database. The system retrieves activity data from the activity database and performs an analysis on the activity data. The task data of the task database is updated based on the analysis of the activity data. The synchronization is performed automatically and periodically without having to require manual updates from users (i.e., without user intervention), which tends to be time consuming and error prone. The database synchronization process may be performed using multiple processing threads.

According to one embodiment, through a first processing thread executed by a processor, a first database is accessed via a first application programming interface (API) over a network to retrieve a list of event objects of the first database. The event objects may be associated with certain activities of an activity database. Through a second processing thread, for each of the event objects, one or more participant identifiers (IDs) are determined from the event object. The participant IDs identify one or more participants participating an event or activity associated with the event object. For each of the participant IDs, a domain ID is extracted from the participant ID. Alternatively, the domain ID can be obtained by searching in a data structure or database, or through a third party such as domain registry. A list of one or more entity objects are identified based on the domain ID, where the entity objects are stored in a second database such as a task database storing and managing many tasks. At least one attribute of at least one of the entity objects is modified based on the participant ID and the domain ID, which generates a modified entity object. Through a third processing thread, any event objects that have been modified are transmitted to the second database via a second API over the network. The first processing thread, the second processing thread, and the third processing thread are executed independently.

In one embodiment, in modifying at least one attribute of at least one entity object, it is determined whether there are multiple entity objects that are associated with the same domain ID. If so, a first entity object is selected from the multiple entity objects based on a set of rules. The attributes of the selected entity object are then modified based on the participant ID and the domain ID. In a particular embodiment, it is determined whether a participant ID matches a creator ID or owner ID corresponding to a creator or owner of any of the entity objects. If so, the first entity object is selected for modification if the first entity object is the only entity object whose creator ID matches the participant ID. Otherwise, if the first entity object is not the only matching entity object, the multiple entity objects are designated as entity object candidates.

In addition, according to another embodiment, for each of the entity objects, it is determined whether one or more task objects that are associated with the entity object. Each task object is associated with a task to be completed within a predetermined period of time. For each of the task objects, it is determined whether a participant ID matches a user ID of any user of a user group associated with the task object. If so, at least one attribute of the task object is modified based on the participant ID.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc. Task database system/server 105 provides task data services to a variety of clients, which may be periodically or constantly accessed and updated by the clients for managing their task management data or other project management data.

In one embodiment, data analytics system or server 104 (also referred to as a data management or synchronization system or server) provides task/project management and/or data analytics services to clients 101-102 based on task data provided by task database system 105 as a data source. Note that although there is only one task database system shown, multiple database systems may also be implemented, where management system 104 may be implemented as a multi-tenancy system that can access multiple database systems concurrently over network 103. For example, a user of client device 101 may be associated with a first organization as a first corporate client to management system 104, while a user of client device 102 may be associated with a second organization as a second corporate client to management system 104. The first and second organizations may employ different ones of database systems 105.

In one embodiment, management system 104 includes, but it is not limited to, task manager 110, activity manager 120, and data store 130. The management system 104 may further include a user interface (not shown), which can be any kind of user interface (e.g., Web, graphical user interface or GUI, an API, or command line interface or CLI) that allows users of client devices 101-102 to access the services provided by project management system 104. In one embodiment, such a service may include initiating or scheduling processing threads to synchronize data between activity database system 106 and task database system 105.

Data store 130 stores or caches data of a variety of tasks or activities, which may be periodically updated from the corresponding data source(s) or data provider(s), in this example, database systems 105-106. Alternatively, task manager 110 and/or activity manager 120 may directly access database systems 105-106 to query and retrieve the corresponding task and activity data. Data stored in data store 130 can be maintained in a variety of data structures, such as tables or databases. Task manager 110 and/or activity manager 120 can access data store 130 via a variety of application programming interfaces (APIs), database queries, or other suitable communication protocols (e.g., structured query language or SQL).

According to one embodiment, task manager 110 is configured to communicate and interact with task database system 105 to obtain task information of tasks maintained in task database system 105. Task manager 110 can communicate with task database system 105 via an API and/or using a communication protocol. For a given user, task manager 110 can communicate with task database system 105 to retrieve a list of tasks that are associated with the user. A user can be an owner of a task, a team member of a team managing the task, or a manager of owners or teams of tasks. For a given task, task manager 110 can also obtain properties or attributes of the task from task database system 105 as a part of task information. Task manager 110 is configured to communicate with task database system(s) 105 using a variety of APIs or protocols compatible with task database system(s) 105. Similarly, activity manager 120 can communicate with activity database system to retrieve activity data. For example, activity database system 106 may be an email server or a calendar server that maintains activities such as emails and/or meetings, etc. A task database can be a customer relationship management (CRM) database.

In one embodiment, activity manager 120 accesses activity database system 106 to retrieve a list of events or event objects of the activity database system 106. The event objects may be associated with certain activities of activity database system 106 such as calendar events. For each of the event objects, activity manager 120 determines or extracts one or more participant identifiers (IDs) from the event object. The participant IDs identify one or more participants participating an event or activity (e.g., a meeting) associated with the event object. For each of the participant IDs, activity manager 120 extracts a domain ID from the participant ID.

Based on the domain ID, task manager 110 identifies a list of one or more entity objects based on the domain ID, where the entity objects are stored in task database system 105. An entity object may be associated with an account or a division of a corporate or enterprise client. In one embodiment, task manager 110 may identify one or more contact objects that have a contact of a user (e.g., email address) matching the domain ID. Task manager 110 then identifies the entity objects that the contact objects belong. At least one attribute of at least one of the entity objects is modified by the task manage 110 based on the participant ID and the domain ID, which generates a modified entity object. For example, contact information of a participant of the event may be updated for the entity object. Any entity objects that have been modified are transmitted to the task database system 105 for update. In addition, for each task object of each entity object, task manager 110 determines whether a participant ID of a participant matches a user of a user group associated with the task object. A task object contains information describing a particular task, which is configured to be performed by a user or a group of users. If so, at least one attribute of the task object is updated or modified. For example, contact information of the matching user of the task object is updated based on the event object. As a result, certain data of activity database 106 and task database 105 can be automatically synchronized.

Figure 1B:
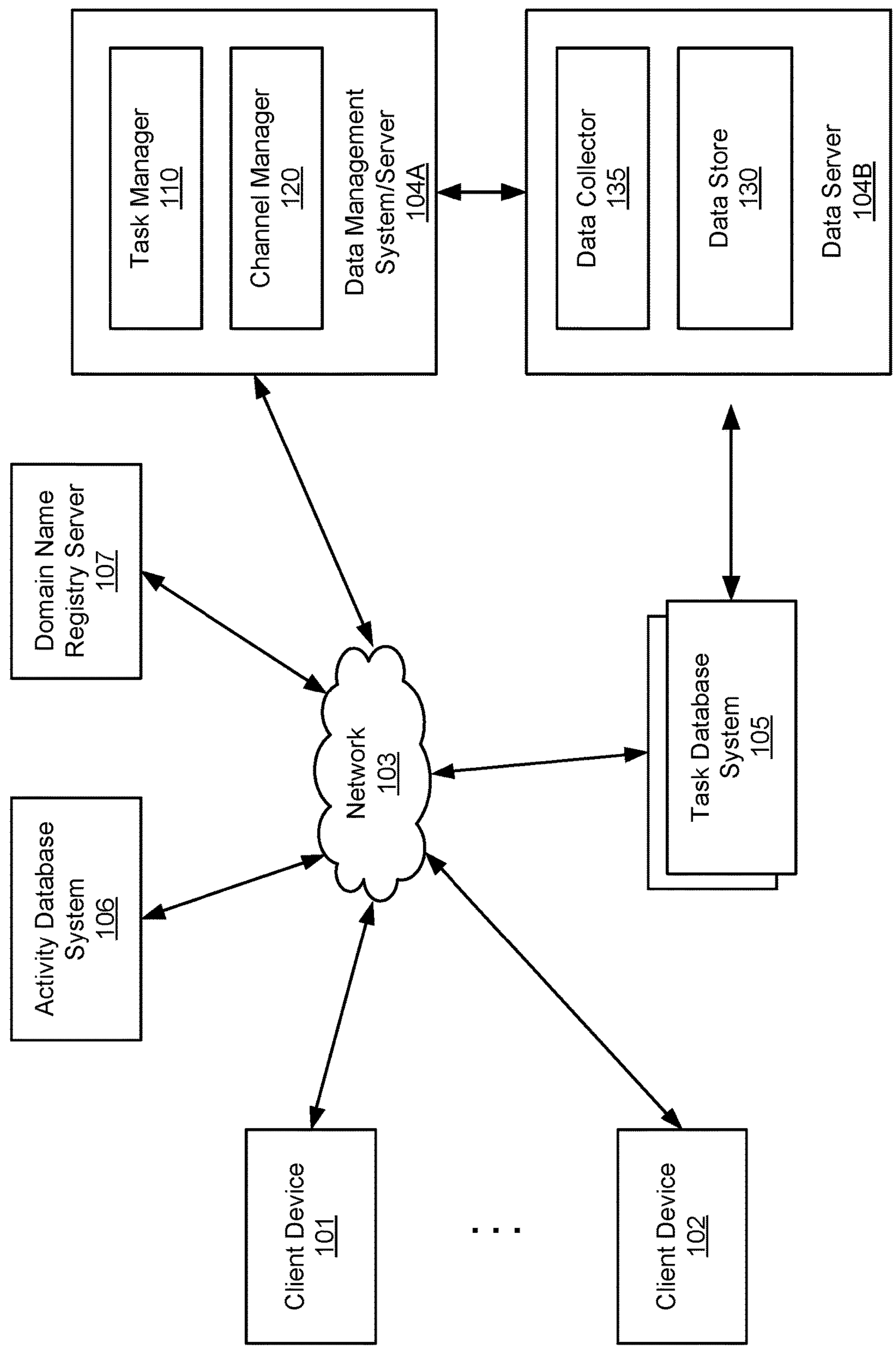

Although in this embodiment, data store 130 is maintained by management system 104, however, data store 130 can be maintained in a dedicated data server that is a separate server from management server 104 as shown in FIG. 1B. Referring now to FIG. 1B, in this embodiment, management server 104A and data server 104B are implemented as separate servers, which may be operated by the same or different organizations or entities. Data store 130 is now maintained by data server 104B. Data server 104B further includes data collector 135 configured to periodically or constantly collect or update task data from data sources 105 and/or 106. The management server 104A communicates with data server 104B using a variety of communication protocols to access task data stored in data store 130.

Figure 2:
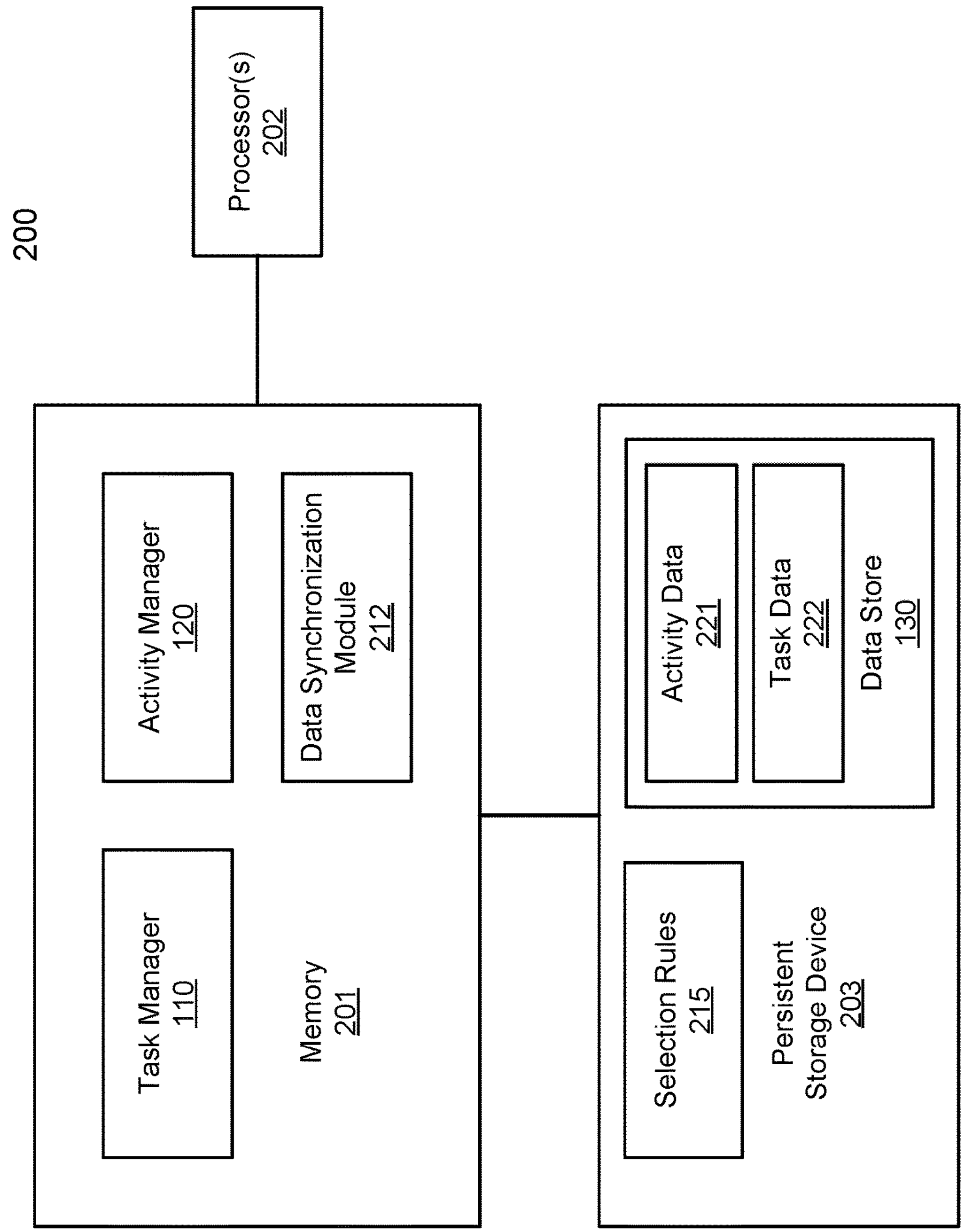
FIG. 2 is a block diagram illustrating an example of a project management system according to one embodiment of the invention.

FIG. 2 is a block diagram illustrating an example of a data management system according to one embodiment of the invention. System 200 may be implemented as part of management system or server 104. Referring to FIG. 2, system 200 includes task manager 110, activity manager 120, and data synchronization module 212. These components or modules can be implemented in software, hardware, or a combination thereof. Some of these components or modules may be integrated into fewer integrated components or modules. These components or modules can be loaded in memory 201 (e.g., volatile memory such as random access memory or RAM) and executed by one or more processors 202 (e.g., microprocessors, central processing units or CPUs). Data store 130 is maintained in persistent storage device 203, such as a hard disk, which may be maintained locally or remotely over a network. At least a portion of data stored in data store 130 may be cached in memory 201.

According to one embodiment, data synchronization module 212 includes a data collector to periodically retrieve activity data from activity server 106 via a first processing thread, which may be executed by processor(s) 202. The activity data may be stored in persistent storage device 203 as a part of activity data 221 of data store. The data collection thread may be executed during the time period in which the activity server 106 is not busy (e.g., at night). Similarly, the data collector may also contact task database system 105 to download task data and store the downloaded task data in persistent storage device 203 as a part of task data 222.

In one embodiment, a second processing thread is periodically executed in which activity manager 120 is configured to parse and analyze activity data 221 and to synchronize and modify certain attributes of task data 222. The first processing thread and the second processing thread may be running independently at different point in time or concurrently during the same period of time. In one embodiment, the activity data 221 includes one or more event objects containing data of certain events. An event can be an email, a calendar event (e.g., a meeting), a chat group (e.g., instant messaging, wechat), etc.

According to one embodiment, activity manager 120 identifies a list of one or more event objects associated with one or more events from activity data 221. An event object refers to a data structure containing information describing a particular event. For example, an event object of an event contains information about the subject and brief description of the event. The event object further includes information concerning the participants that participated or will participate the event, such as, for example, the names or IDs, and/or email addresses of the participant.

For each of the event objects found in activity data 221, activity manager 120 determines participant IDs identifying the participants of the corresponding event. A participant ID can be an email address, a chat ID, and/or a mobile phone number of a participant. For each of the participant IDs, activity manager 120 determines or extracts a domain ID identifying a domain associated with the corresponding participant. For example, if a participant ID includes an email address such as john_smith@abc_corporation.com, the domain ID associated with the participant ID will include "abc_corporation" or "abc_corporation.com." Alternatively, a domain ID can be obtained by performing a lookup operation in a data structure or database containing the domain IDs. For example, a domain ID can be obtained by communicate with a domain name registry such as domain name registry server 107. Note that an email address can be utilized as a part of a domain ID. However, a domain ID can also be other forms or types of information such as telephone numbers, etc.

Figure 3:
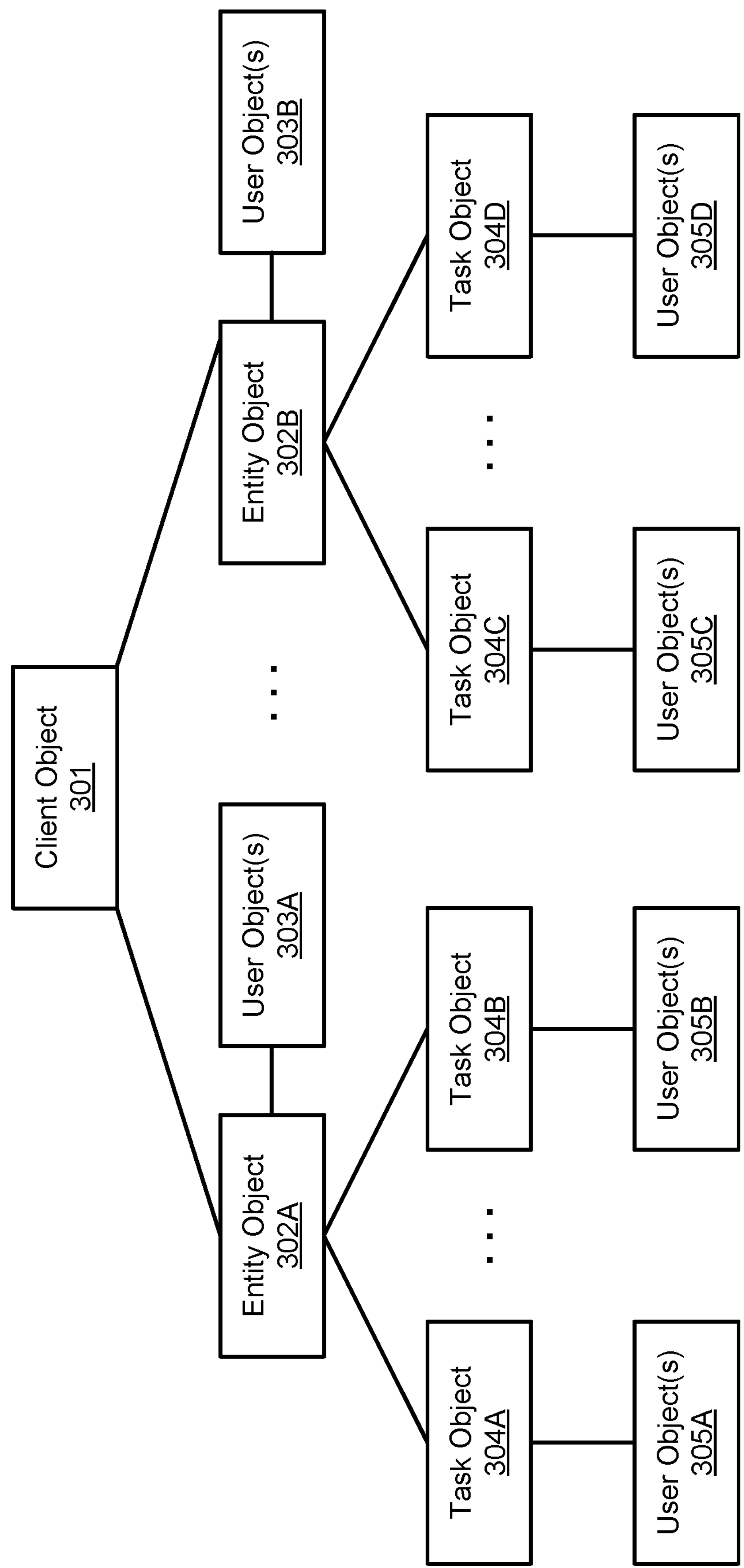
FIG. 3 is a block diagram illustrating data structures of data objects of a database system according to one embodiment.

For each domain ID, task manager 110 searches and identifies one or more entity objects from task data 222 that are associated with the domain ID. Typically, a domain ID is associated with a specific corporate or enterprise client and each client may have one or more entities (e.g., corporate divisions or accounts) as shown in FIG. 3. For example, a domain name is typically associated with an entity. Referring to FIG. 3, task database system 105 may store a number of client objects such as client object 301, each client corresponding to a corporate or enterprise client. Each client object may include one or more entity objects such as entity objects 302A-302B.

For example, a corporation may have a U.S. entity account and a European entity or account. In one embodiment, task data 222 may include a mapping table (not shown) to map domain IDs or domain names to client IDs and/or entity IDs. The mapping table includes a number of mapping entries and each mapping entry maps a particular domain ID to one o more particular client IDs and/or entity IDs. Based on a given domain ID, task manager 110 performs a lookup operation in the mapping table to locate and determine one or more client IDs or entity IDs. Based on the client ID and/or entity ID, task manager 110 accesses task data 222 to locate a client object or an entity object. Note that a single ID can be mapped to multiple objects. A user object associated with the client object and/or the entity object may be updated based on the participant ID.

Each entity object may further be associated with one or more user objects (e.g., user objects 303A-303B) corresponding to one or more users associated with the entity (e.g., entity level users). A user object may contain user information of a particular user such as contact information of the user (e.g., name, phone number, email address, and/or chat ID). Each entity object may further be associated with one or more task objects such as task objects 304A-304D. Each task object contains information or metadata describing a particular task such as a project, an opportunity, or a deal. Each task object may further be associated with one or more user objects such as user objects 305A-305D. User objects 305A-305D contain user information of users that are a part of a user group associated with a specific task or tasks. A user object may be associated with one or more task objects. A user object may also be associated with one or more entity objects.

Referring FIGS. 2 and 3, if there is an entity object that is associated with a domain ID of a participant, at least one attribute of the entity object is modified or updated. For example, a user object such as user object 303A of entity object 302A matching at least a portion of the participant ID may be updated. For example, a new email address or phone number of an existing user of an existing user object may be added. If there is no existing user object matching the participant ID, a new user object may be created based on the information obtained based on the participant ID. In one embodiment, a user object may be a contact object containing contact information of a user, who is associated with a particular entity object. Alternatively, according to another embodiment, for a given domain ID, task manager 110 searches and finds a list of one or more user objects containing information matching that particular domain ID. A list of one or more entity objects associated with the user objects are then identified. The entity objects are then updated based on the participant IDs of the events, such as modifying an existing user object or creating a new user object associated with the entity object.

In one embodiment, for a given participant ID, task manager 110 is configured to determine whether a domain ID of the participant ID is found in a list of one or more predetermined domain IDs. If the domain ID matches at least one of the domain IDs in the list, the domain ID is removed from being processed for the purpose of updating user objects in database system 105. The list of predetermined domain IDs can be a black list of certain domain IDs. For example, a first corporation that provides services to a second corporate client would only wish to modify or update user objects of the second corporate client. Thus, if a participant ID of a participant identifies a user associated with the first corporation, such a participant ID would be removed for the purpose of updating user objects of the second corporate client.

As shown in FIG. 3, a client may include multiple entities represented by corresponding entity objects such as entity objects 302A-302B. If a domain ID matches multiple entity objects, according to one embodiment, task manager 110 may attempt to determine and select one of the entity objects for updating based on a set of one or more rules such as selection rules 215. In selecting an entity object based on rules 215, according to one embodiment, task manager 110 determines whether a particular participant ID of a participant initiated the event and the participant ID matches an owner ID of an entity object. If so, the entity object is selected for update. A participant initiating an event refers to a user who started or initiate a conversation or sent a meeting invitation to other participants, also referred to as an event owner or activity owner. An owner of an entity object refers to a user who is in charge or have a certain user role of a corresponding entity. If the above condition or conditions are not satisfied and no entity object has been selected, all of the entity object matching the particular domain ID are considered as entity object candidates, also referred to as eligible entity objects.

For the entity object candidates, one or more predetermined criteria, which may be configured as a part of rules 215, are utilized as a tie breaker to select one of the entity object candidate for update purpose. The criteria may include certain predefined fields for matching between an entity object and a user object of a participant or certain field values of certain fields between an entity object and a user object. For example, an entity object having a geographical area matching the one with a user object may be selected. An entity object may be selected with the most number of user objects or most number of task objects. After examining all of the criteria and there are still multiple entity objects remained, the task manager 110 may select all of the entity objects, the most recently updated entity object, or simply a random entity object. These can be user configurable as a part of rules 215.

In addition, according to another embodiment, user objects of an entity object such as user objects 305A-305D of task data 222 may also be updated based on the participant IDs obtained from the activity data 221. For example, if a domain ID of a participant ID matches a domain ID of any of the user objects of one or more task objects (e.g., task objects 304A-304B) a particular entity object (e.g., entity object 302A) that matches the domain ID, the user objects 305A-305B may also be updated (e.g., creating a new user object, modifying an existing user object). Alternatively, if a particular participant ID matches an owner ID or a user member ID of a member of a user group (e.g., a team member) of a particular task of the matching entity object, at least one attribute of the corresponding user object may be updated.

If there are multiple tasks that match a domain ID of a participant ID, a set of one or more rules are utilized as a tie breaker to select one of the task objects for update, which may be configured as a part of rules 215. For example, a particular field or field value of a task may be used as matching criteria. If after all, there are still multiple task objects remained, task manager 110 may update all of the task objects, a task object with highest task value or task size (e.g., highest revenue of a deal or opportunity), or a random task object.

After all of the event objects of activity data 221 have been processed and the related entity objects and task objects of task data 222 have been updated. The updated or modified task data 222 will be pushed by data synchronization module 212 back to task database system 105 to be stored there. The updated task data may be pushed to task database system 105 via a third processing thread that is independent from the first processing thread and the second processing thread. Alternatively, some of the first processing thread, the second processing thread, and the third processing thread may be combined into a single thread.

Note that some or all of the components as shown and described above (e.g., task manager 110 and/or activity manager 120 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
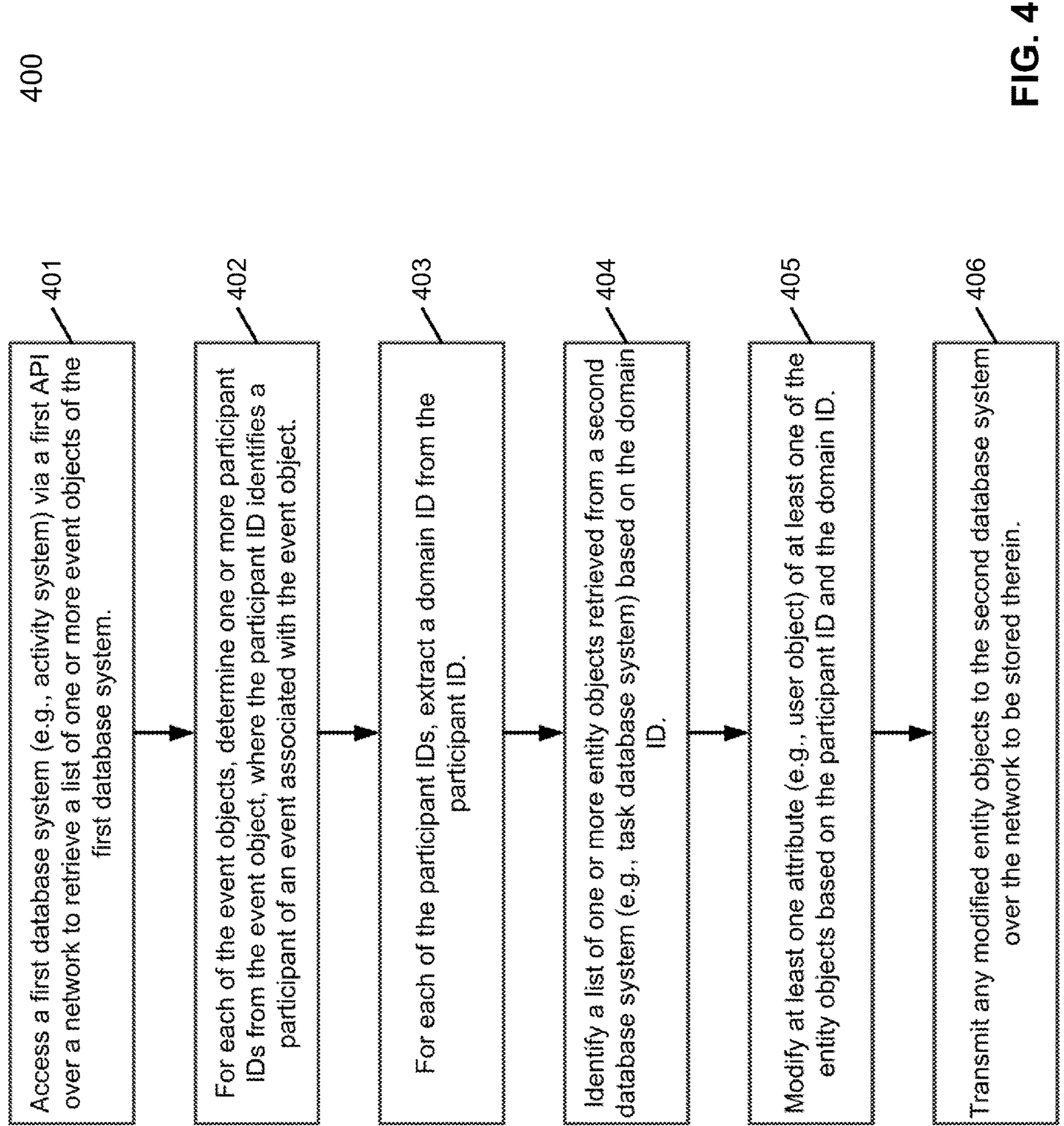
FIG. 4 is a flow diagram illustrating a process of database synchronization according to one embodiment of the invention.

FIG. 4 is a flow diagram illustrating a process of database synchronization according to one embodiment of the invention. Process 400 may be performed by processing logic which may include software, hardware, or a combination thereof. For example, process 400 may be performed by system 200 of FIG. 2. Referring to FIG. 4, in operation 401, for example, via a first processing thread, processing logic accesses a first database system (e.g., activity system or server) via a first API over a network to retrieve a list of event objects of the first database system. The event objects may represent calendar events or email activities. In operation 402, for example, via a second processing thread, for each of the event objects, processing logic determines one or more participant IDs from the event object. The participant IDs identify the participants that participated or will participate the event corresponding to the event object. A participant ID may be an email address of a participant.

For each of the participant IDs, in operation 403, processing logic extracts a domain ID from the participant ID. In operation 404, based on the domain ID, processing logic identifies a list of one or more entity objects retrieved from a second database system (e.g., task database system). The entity objects may be retrieved from a second database (e.g., task database) via a separate processing thread. In operation 405, processing logic modifies at least one attribute of at least one of the entity objects based on the participant ID and the domain ID. For example, processing logic may create a contact object to store the contact information of the corresponding participant, including the participant's email address. The contact object may be associated with the corresponding entity object. In operation 406, via a third processing thread, any modified entity objects are then transmitted back to the second database system to be stored there. The first processing thread, the second processing thread, and the third processing thread may be executed in parallel and independently. Alternatively, some of these processing threads may be integrated into a single processing thread.

Figure 5:
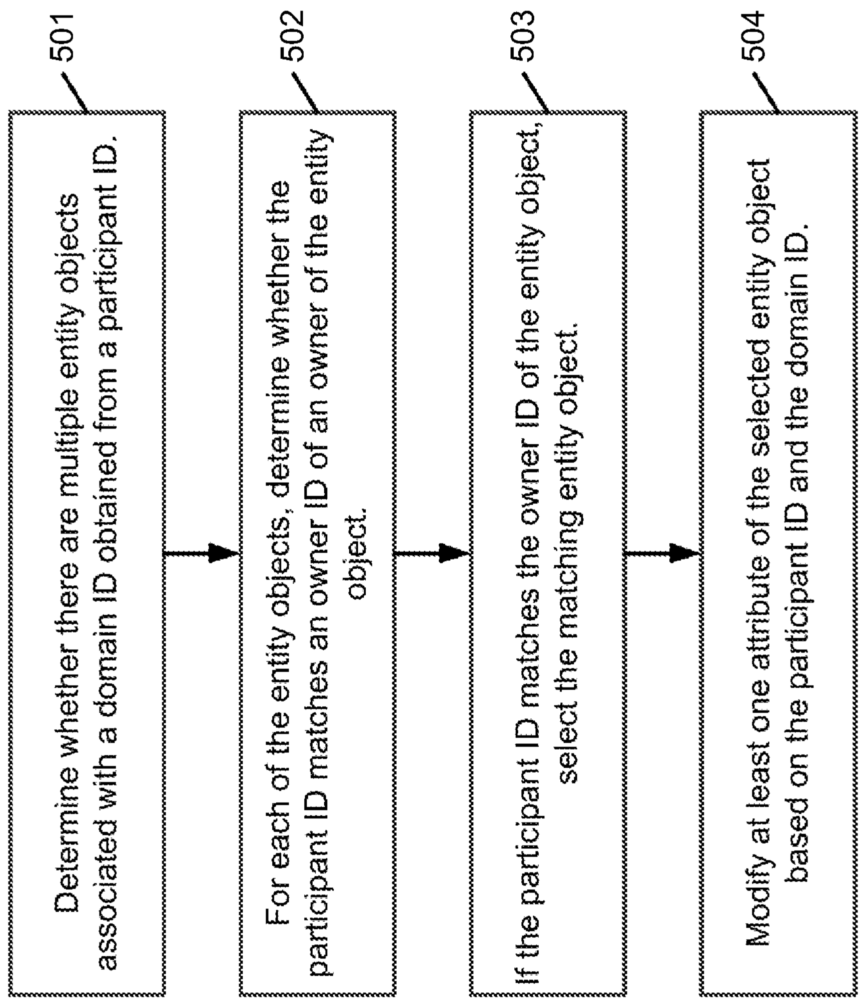
FIG. 5 is a flow diagram illustrating a process of updating databases according to one embodiment of the invention.

FIG. 5 is a flow diagram illustrating a process of updating databases according to one embodiment of the invention. For example, process 500 may be performed as a part of operation 405 of FIG. 4. Referring to FIG. 5, in operation 501, processing logic determines whether there are multiple entity objects associated with a particular domain ID that was extracted from a participant ID. In operation 502, processing logic determines whether the participant ID matches an owner ID corresponding to an owner of any of the entity objects. An owner of an entity object refers to a use who is in charge or owns the entity object (e.g., having a leading user role). If the participant ID matches the owner ID of the entity object, in operation 503, the matching entity object is selected. In operation 504, at least one attribute of the selected entity object is modified. For example, a contact object or user object associated with the entity object may be created or modified based on the participant ID.

Figure 6:
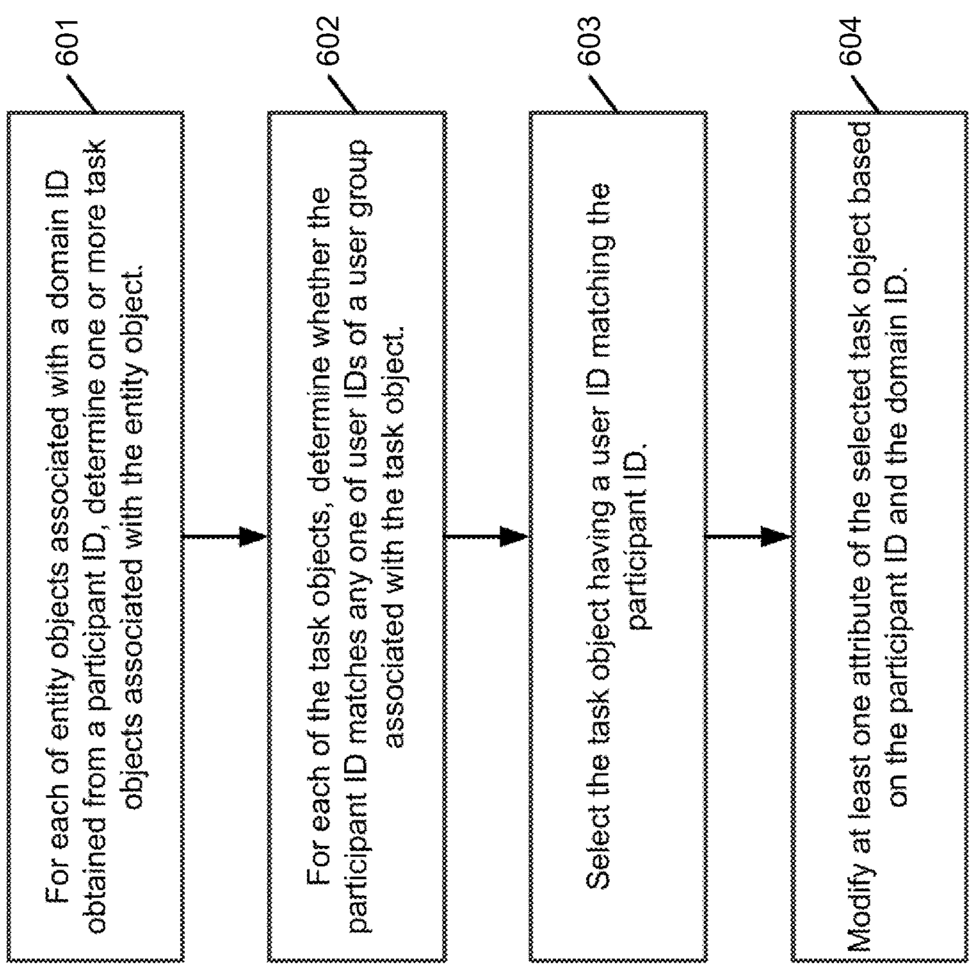
FIG. 6 is a flow diagram illustrating an example of a process of updating task objects according to one embodiment of the invention.

FIG. 6 is a flow diagram illustrating an example of a process of updating task objects according to one embodiment of the invention. Referring to FIG. 6, in operation 601, for each of the entity objects that match a particular domain ID extracted from a participant ID, processing logic determines one or more task objects associated with the entity object. Each task object contains information describing a task to be completed (e.g., a project, an opportunity). For each of the task objects, processing logic determines whether the participant ID matches any of user IDs of a user group (e.g., team members) associated with the task object. In operation 603, a task object having a user ID of a user group matching the participant ID is selected. In operation 604, processing logic modifies at least one attribute of the selected task object based on the participant ID. For example, processing logic may create a new contact object or update an existing contact object of a participant identified by the participant ID.

Note that throughout this application, a task may refer to a project, a deal, or an opportunity of an enterprise project, such as a sales contract or sales deal. An activity system may be an email or calendar system. An event may be an email event or a calendar event (e.g., meeting). A participant ID may include an email address of a user or user group. An example of task database system 105 may be a customer relationship management (CRM) system that provides CRM data services. Task or CRM data includes any kinds of customer relationship management data, such as, for example, projects, tasks, deals, contracts, etc. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

One of the goals is to update the contact information of a database entry of a CRM system based on the email or calendar activities automatically and periodically without user intervention. By using the techniques described above, the process can update a large amount of CRM records based on a large amount of activities automatically with minimum errors.

Figure 7:
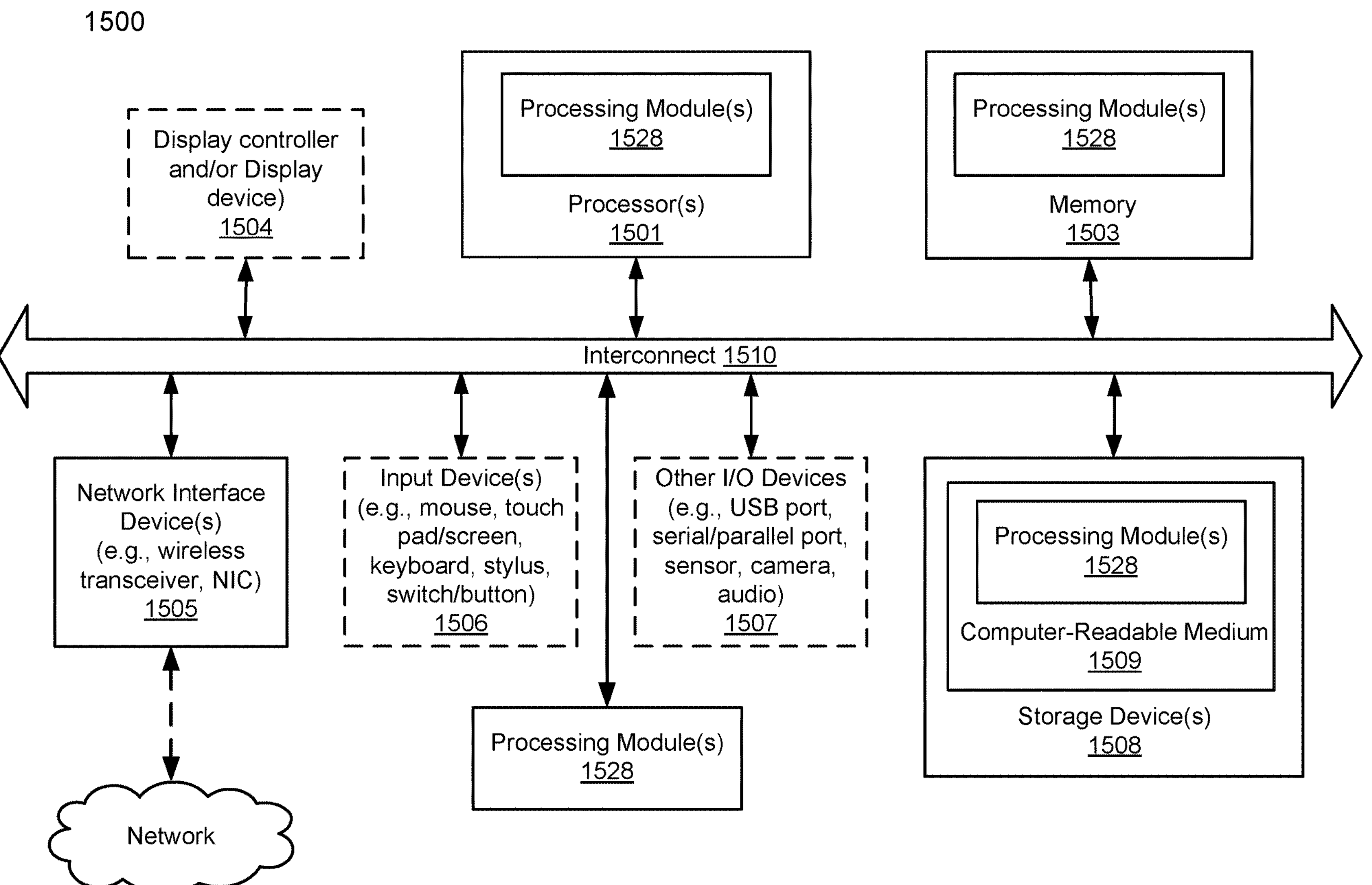
FIG. 7 is a block diagram illustrating a data processing system according to one embodiment.

FIG. 7 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102 and servers 104-107 of FIGS. 1A-1B, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 110, activity manager 120, and/or data synchronization module 212 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for synchronizing databases using multi-threading, the method comprising:

periodically and automatically via a first processing thread executed by a processor, accessing a first database system via a first application programming interface (API) over a network to retrieve a list of a plurality of event objects of the first database system;

periodically and automatically via a second processing thread, for each of the event objects, determining one or more participant identifiers (IDs) from the event object, the participant IDs identifying one or more participants associated with the event object, each participant having contact information, for each of the participant IDs, extracting a domain ID from the participant ID, identifying a list of one or more entity objects from a second database system based on the domain ID, for each of the one or more entity objects in the list, determining one or more task objects associated with the entity object, each task object being associated with a user group, the user group including a first user ID and a second user ID, each user ID associated with a user object, for each of the one or more task objects, determining that the participant ID matches the first user ID of the user group, and does not match the second user ID of the user group, in response to determining that the participant ID matches at least one user ID of the user group, modifying the entity object to generate a first modified entity object, including updating contact information of a user object associated with the first user ID with contact information of the participant associated with the participant ID, and in response to determining that the participant ID does not match any of the user IDs of the user group, modifying the entity object to generate a second modified entity object, including creating a new user object with the participant ID and the contact information of the participant; and periodically and automatically via a third processing thread, transmitting each entity object that has been modified to the second database system via a second API over the network, wherein the first processing thread, the second processing thread, and the third processing thread are executed independently.

2. The method of claim 1, further comprising:

for each of the domain IDs obtained from the participant IDs, determining whether the domain ID matches one of predetermined domain IDs; and removing any matching domain ID prior to identifying event objects based on the domain IDs.

3. The method of claim 1, further comprising:

determining whether there are a plurality of entity objects associated with the domain ID;

in response to determining that there are multiple entity objects associated with the domain ID, selecting a first entity object from the plurality of entity objects based on a set of one or more selection rules; and modifying at least one attribute of the first entity object based on the participant ID and the domain ID.

4. The method of claim 3, wherein selecting a first entity object from the plurality of entity objects comprises:

determining whether the participant ID matches an owner ID corresponding to an owner of any of the entity objects; and if the participant ID matches an owner ID of any of the entity objects, selecting the first entity object.

5. The method of claim 4, further comprising selecting the first entity object if a participant associated with the participant ID initiated an event associated with the event object in the first database system and the participant is an owner of the first entity object in the second database system.

6. The method of claim 1, further comprising:

determining whether the participant ID matches an owner ID of an owner of a first task object of the task objects; and modifying at least one attribute of the first task object if the participant ID matches the owner ID of the first task object.

7. A non-transitory machine-readable medium having instructions stored therein, which when executed by a processor, cause the processor to perform operations, the operations comprising:

periodically and automatically via a first processing thread executed by a processor, accessing a first database system via a first application programming interface (API) over a network to retrieve a list of a plurality of event objects of the first database system;

periodically and automatically via a second processing thread, for each of the event objects, determining one or more participant identifiers (IDs) from the event object, the participant IDs identifying one or more participants associated with the event object, each participant having contact information, for each of the participant IDs, extracting a domain ID from the participant ID, identifying a list of one or more entity objects from a second database system based on the domain ID, for each of the one or more entity objects in the list, determining one or more task objects associated with the entity object, each task object being associated with a user group, the user group including a first user ID and a second user ID, each user ID associated with a user object, for each of the one or more task objects, determining that participant ID matches the first user ID of the user group, and does not match the second user ID of the user group, in response to determining that the participant ID matches at least one user ID of the user group, modifying the entity object to generate a first modified entity object, including updating contact information of a user object associated with the first user ID with contact information of the participant associated with the participant ID, and in response to determining that the participant ID does not match any of the user IDs of the user group, modifying the entity object to generate a second modified entity object, including creating a new user object with the participant ID and the contact information of the participant; and periodically and automatically via a third processing thread, transmitting each entity object that has been modified to the second database system via a second API over the network, wherein the first processing thread, the second processing thread, and the third processing thread are executed independently.

8. The machine-readable medium of claim 7, wherein the operations further comprise:

for each of the domain IDs obtained from the participant IDs, determining whether the domain ID matches one of predetermined domain IDs; and removing any matching domain ID prior to identifying event objects based on the domain IDs.

9. The machine-readable medium of claim 7, wherein the operations further comprise:

determining whether there are a plurality of entity objects associated with the domain ID;

in response to determining that there are multiple entity objects associated with the domain ID, selecting a first entity object from the plurality of entity objects based on a set of one or more selection rules; and modifying at least one attribute of the first entity object based on the participant ID and the domain ID.

10. The machine-readable medium of claim 9, wherein selecting a first entity object from the plurality of entity objects comprises:

determining whether the participant ID matches an owner ID corresponding to an owner of any of the entity objects; and if the participant ID matches an owner ID of any of the entity objects, selecting the first entity object.

11. The machine-readable medium of claim 10, wherein the operations further comprise selecting the first entity object if a participant associated with the participant ID initiated an event associated with the event object in the first database system and the participant is an owner of the first entity object in the second database system.

12. The machine-readable medium of claim 7, wherein the operations further comprise:

determining whether the participant ID matches an owner ID of an owner of a first task object of the task objects; and modifying at least one attribute of the first task object if the participant ID matches the owner ID of the first task object.

13. A data processing system, comprising:

a processor; and a memory coupled to the processor to store instructions, which when executed by the processor, cause the processor to perform operations, the operations including periodically and automatically via a first processing thread executed by a processor, accessing a first database system via a first application programming interface (API) over a network to retrieve a list of a plurality of event objects of the first database system, periodically and automatically via a second processing thread, for each of the event objects, determining one or more participant identifiers (IDs) from the event object, the participant IDs identifying one or more participants associated with the event object, each participant having contact information, for each of the participant IDs, extracting a domain ID from the participant ID, identifying a list of one or more entity objects from a second database system based on the domain ID, for each of the one or more entity objects in the list, determining one or more task objects associated with the entity object, each task object being associated with a user group, the user group including a first user ID and a second user ID, each user ID associated with a user object, for each of the one or more task objects, determining that participant ID matches the first user ID of the user group, and does not match the second user ID of the user group, in response to determining that the participant ID matches at least one user ID of the user group, modifying the entity object-to generate a first modified entity object, including updating contact information of a user object associated with the first user ID with contact information of the participant associated with the participant ID, and in response to determining that the participant ID does not match any of the user IDs of the user group, modifying the entity object to generate a second modified entity object, including creating a new user object with the application ID and the contact information of the participant, and periodically and automatically via a third processing thread, transmitting each entity object that has been modified to the second database system via a second API over the network, wherein the first processing thread, the second processing thread, and the third processing thread are executed independently.

14. The system of claim 13, wherein the operations further comprise:

for each of the domain IDs obtained from the participant IDs, determining whether the domain ID matches one of predetermined domain IDs; and removing any matching domain ID prior to identifying event objects based on the domain IDs.

15. The system of claim 13, wherein the operations further comprise selecting a first entity object from the plurality of entity objects, including:

determining whether the participant ID matches an owner ID corresponding to an owner of any of the entity objects; and if the participant ID matches an owner ID of any of the entity objects, selecting the first entity object.

16. The system of claim 15, wherein the operations further comprise selecting the first entity object if a participant associated with the participant ID initiated an event associated with the event object in the first database system and the participant is an owner of the first entity object in the second database system.

17. The system of claim 13, wherein the operations further comprise:

for each of the entity objects, determining one or more task objects associated with the entity object, each task object being associated with a task to be completed;

for each of the task objects, determining whether the participant ID matches any of user IDs of a user group associated with the task; and modifying at least one attribute of the task object if the participant ID matches any of the user IDs of the user group.

18. The system of claim 17, wherein the operations further comprise:

determining whether the participant ID matches an owner ID of an owner of a first task object of the task objects; and modifying at least one attribute of the first task object if the participant ID matches the owner ID of the first task object.

* * * * *